United States Patent [19]
Slater et al.

[11] Patent Number: 6,157,435
[45] Date of Patent: Dec. 5, 2000

[54] IMAGE PROCESSING

[75] Inventors: Walter C. Slater, Prattsburgh; Thomas J. Murray, Mt Morris, both of N.Y.

[73] Assignee: Eastman Kodak Company, Rochester, N.Y.

[21] Appl. No.: 09/087,014

[22] Filed: May 29, 1998

[51] Int. Cl.[7] .............................. G03B 27/52; H04N 1/00
[52] U.S. Cl. .................. 355/40; 355/41; 355/77; 396/311; 358/487; 382/305; 705/14; 348/96
[58] Field of Search ................... 355/18, 40, 41, 355/77; 396/311, 429, 310, 319; 705/14, 23, 26, 27; 358/506, 527, 487, 474; 348/96, 97; 382/209, 305, 306, 311

[56] References Cited

U.S. PATENT DOCUMENTS

| | | |
|---|---|---|
| 3,790,275 | 2/1974 | Huboi et al. ............................. 355/68 |
| 4,723,212 | 2/1988 | Mindrum et al. . |
| 4,910,672 | 3/1990 | Off et al. . |
| 5,321,465 | 6/1994 | Hicks . |
| 5,359,387 | 10/1994 | Hicks . |
| 5,428,423 | 6/1995 | Clark . |
| 5,612,868 | 3/1997 | Off et al. . |
| 5,889,578 | 3/1999 | Jamzadeh ............................... 355/41 |
| 5,949,551 | 9/1999 | Miller et al. ........................... 358/527 |
| 6,009,410 | 12/1999 | LeMole et al. ......................... 705/14 |
| 6,017,157 | 1/2000 | Garfinkle et al. ...................... 355/40 |
| 6,026,370 | 2/2000 | Jermyn .................................. 705/14 |

Primary Examiner—Alan A. Mathews
Attorney, Agent, or Firm—Gordon M. Stewart; David A. Novais

[57] ABSTRACT

A method of processing customer image orders, each of at least one image capturing an original scene. An image content identification in the form of an image content identification signal, is generated based on an identification of one or more scene objects, for at least one image of a customer order. The generated image content identification is compared with different image content identifications stored in a memory in association with respective predetermined customer certificate data. When at least a generated image content identification matches a stored image content identification, generating a customer certificate from the stored certificate data associated with the matching stored image content identification. The method can be used with customer image sets which may not be image orders. An apparatus and computer program product which can execute such a method, are also provided.

64 Claims, 12 Drawing Sheets

IMAGE PROCESSING

FIELD OF THE INVENTION

This invention relates generally to the field of photography, and in particular to processing of images.

BACKGROUND OF THE INVENTION

In typical photofinishing operations a user (sometimes referenced as a customer), delivers one or more film rolls carrying corresponding exposed films, to a processing laboratory to have them chemically developed and hardcopies of the images (such as paper prints or slides) prepared. The user can include an individual or a retail store. Individual films are often spliced together end to end to form a larger roll which is easily handled by automated equipment. Following chemical processing of the roll to yield permanent images from the latent images on the films, each image is scanned at high speed to obtain image characteristics, such as color and density. These characteristics are passed to an optical printer which uses the characteristic data to adjust exposure conditions (such as exposure time, color balance, and the like) of an image frame on the developed film which is optically projected onto a photosensitive paper. The exposed photosensitive paper is then chemically developed to yield the final hardcopy prints. In modem photofinishing operations, images may optionally also be scanned to provide an image signal corresponding to each image on the film. These image signals are usually stored on a medium such as a magnetic or optical disk and provided to the customer, or made available to the customer over the Internet, and may be used then or at a later time to provide a hardcopy output. When the customer order is completed, each film is cut into strips (for 35 mm film) or reattached to a film cassette (for Advanced Photo System films), the exposed paper (when prints are made) is cut into individual prints, and the film, completed prints and any other media (such as a disk bearing scanned images, or mounted slides) are packaged at a finishing station and the order is then complete. Recently it has been described that in the foregoing type of photofinishing operation, the optical printer can be replaced with a digital printer which will print the images directly from the scanned data, following enhancements or other manipulations to the scanned images.

There is a high degree of interest among photographers in using the images returned from a photofinisher in a multitude of products, other than in typical prints or slides. For example, it is known to provide a service whereby a photographer can provide a particular image to a service operator, who will scan the image and print it on T-shirts, cups, calendars, or similar items. Such products can also be ordered remotely from a personal computer using digitized images and a service such as Eastman Kodak's KODAK IMAGE MAGIC PRINT SERVICE. However, this requires the photographer to have some independent knowledge beforehand of the type of service she might want, and how and where to obtain that service. Furthermore, prior to accessing that specific service and typically until the desired product is produced, the photographer has only a vague mental idea as to how a finished product using one of his own images (versus a "stock" image) might look in the finished product. However, photographers are left to their own devices to locate products or services which might be of interest to them even though they may repeatedly indicate an interest in such products or services by the pictures they take. It has been known for photofinishers to include in a large number of completed photographer orders, the same coupon or other advertising material. However, such a generalized approach provides photographers with information which is little more than the equivalent of that provided by "junk mail", since it completely fails to take into account an individual photographer's preferences, and particularly their preferences in relation to their own images.

It would be desirable if some way was provided to readily make available to a photographer a type of product or service she might already want, with little or no effort to locate such a product or service on the photographer's part. It would be particularly desirable to readily make available such a product or service in relation to a consumer's images, and further desirable if in the case of a product the consumer could simultaneously be provided with a realistic view of a final product incorporating the consumer's image before ordering that product.

SUMMARY OF THE INVENTION

The present invention realizes that consumers have been vastly underserved by a failure to bring to a consumer's attention, products or services that they may already have indicated they may be interested in simply by the content of the pictures they have taken. This is particularly true of products or services which use the photographer's own images. For example, a photographer who takes pictures of cars, has a relatively high likelihood that she has an interest in cars generally such that she would like to know about particular products or services for cars. A photographer who takes a picture of babies has a relatively high likelihood that they would be interested in baby products or services, and particularly in products or services which actually use the photograph of the baby (for example, a mug or a calendar incorporating that picture). The present invention further realizes that particularly in a digital photofinishing environment, the opportunity exists to readily capture image content information which can be used to readily provide information on products or services likely of interest to the photographer, and in the case of products incorporating images, to simultaneously provide the photographer with a realistic view of a product incorporating their own particular image.

Accordingly, the present invention provides in one aspect, a method a method of processing customer image sets each of at least one image, comprising generating an image content identification in the form of an image content identification signal. The image content identification is based on an identification of one or more scene objects. When at least a generated image content identification corresponds to customer certificate data stored in a memory, a customer certificate is generated from the corresponding stored certificate data. "At least" in the foregoing context, refers to this being a minimum requirement, and their could be additional requirements before a customer certificate is generated. The foregoing correspondence may be determined, for example, by comparing the generated content identification with stored identifications (either directly or through look-up tables or other database, or through an algorithm).

In any of the embodiments of the present invention, the image sets may be, but need not necessarily be, in the form of an image order which includes not only the image set but also an associated request for a product or service. Similarly, in any embodiment of the present invention, the image orders may be image sets. The requested product or service typically, but not necessarily, incorporates or uses one or more images of the image order.

One aspect of the invention includes reviewing the images to generate the content identification. This can be done by a processor using image recognition software. However, it is preferred that this be done with the assistance of an operator. In this event, the images are in the form of image signals (such as obtained from scanning the images). Simulated images corresponding to the image signals are shown on a display, and the image content identification signal is generated in response to an operator input following viewing the simulated images on the display.

Generation of a customer certificate may optionally also be a function of one or more received image category identification. For example, category identifications can be used to determine if a customer certificate will be generated even though there may be a content identification match. In another example, when there are multiple predetermined certificate data associated with a first content identification, and the generated image content identification matches the first content identification, the customer certificate may be generated from data which is selected from the multiple certificate data based on the category identification associated with the customer order containing the image which prompted generation of the certificate. Image category identifications can be any other predetermined identification which is generally unrelated to an image scene content (although it could be based on scene content). Image category identifications can come from any desired source such as a machine readable code on the film carrying the images, or on some other medium (for example, a bag containing the film) associated with the customer image order.

In another aspect, the present invention provides a method of processing customer image orders each of at least one photographic film containing one or more images which capture an original scene. In this aspect, the films are chemically developed, and the images on the developed films scanned to yield corresponding image signals. An image content identification is generated as already described, for at least one image of a customer order, and a customer certificate generated, as appropriate, as described above. This certificate is then printed, the customer orders fulfilled, and each printed customer certificates collated with the fulfilled customer order containing the image which prompted generation of that certificate.

In a further aspect, the method of the present invention provides for processing customer image orders each of at least one photographic media carrying one or more images each capturing an original scene. The images are scanned to obtain the corresponding image signals. These image signals are reviewed (preferably through the use of a display with operator, as described above). An image content identification is generated and compared to find corresponding customer certificate data, in any of the ways described herein. In this aspect, a composite customer certificate is generated from the corresponding customer certificate data and from the image which prompted generation of that certificate.

Optionally, the methods of the present invention allow for assigning a unique identification to a set of images of a customer order (such as the images of one film), and storing the corresponding image signals in association with the unique identification in an image database. The unique identification can be printed on the composite customer certificate.

As an additional option, the method of the present invention provides for a generated customer certificate to carry an indication of a product or service for the image printed on the certificate. This can be, but need not be, part of a same code referencing the unique identification of a set of images. In this option, the method additionally can include retrieving an image signal of the image set in the database, which corresponds to the printed unique identification. The product or service identified by the indication can then be produced or performed, using the retrieved image signal. Thus, a customer on redeeming such a certificate can end up with the product or certificate which the certificate indicates, and which incorporates the same image as shown on the certificate (although it may or may not be modified from the form shown on the certificate) or another image of the same customer order from which the image shown on the certificate came. The product or service indication, as well as the unique identification of the set of images, may optionally be carried on the certificate as a machine readable code which can be read by a suitable code reader.

The present invention provides, in a further aspect, a method in which a code associated with a hardcopy of an image is read, which code identifies a product to be made or a service to be performed using the image. A code signal is generated which corresponds to the read code. An image signal which corresponds to the hardcopy image, is retrieved from an image database of multiple saved image signals. A product is produced or a service performed as identified by the code, using the retrieved image signal. The identification provided by this or any other code, can be expressly in the code, or by a predetermined association (such as contained in the database) of particular codes with particular products and/or services. The code may, for example, identify a modification to me made to a retrieved image signal, and the retrieved image signal can be modified in accordance with the code (such modification can take place before, during, or after the image signal is actually retrieved). The code may also optionally include a unique identification of the image signal which is to be retrieved.

Another aspect of the method of present invention provides reading at a first location a code associated with a hardcopy of an image which code identifies a product to be made or a service to be performed using the image, and uniquely identifies the image. A code signal is generated which corresponds to the read code. The generated code signal is transmitted to a processor remote from the first location. At the remote processor, an image signal corresponding to the hardcopy image is retrieved from an image database of multiple saved image signals using the generated code signal. The product is generated or the service performed, as identified by the code and using the retrieved image signal.

The present invention further provides an apparatus which includes components which can execute the steps of any of the methods of the present invention. The present invention further provides a computer program product comprising a computer readable storage medium having a computer program stored thereon. This computer program, when loaded into a the computer, causes the computer to perform the steps of:

(a) comparing a generated image content identification based on an identification of one or more objects in an original scene captured by a customer image, with different image content identifications stored in a memory in association with respective predetermined customer certificate data; and (b) when at least a generated image content identification matches a stored image content identification, generating a customer certificate from the stored certificate data associated with the matching stored image content identification.

Further aspects of the present invention include a computer program product which has a computer program stored thereon, which when loaded into the computer, can cause the steps of any of the methods of the present invention to be executed.

The present invention then, provides any one or more of the following advantages, or provides other advantages which will be appreciated from the description in this application. These include providing a way to readily make available to a customer, a type of product or service she might already want, with little or no effort to locate such a product or service on the customer's part. In particular, such products or services can particularly be made readily available, which use a customer's image. Ready access, retrieval, and modification of customer's images can also be enabled, to produce a product or provide a service, using a customer's image, with little or no effort by the customer or others.

BRIEF DESCRIPTION OF THE DRAWINGS

Embodiments of the invention will now be described with reference to the drawings in which.

Where possible, the same reference numbers have been used throughout the drawings to indicate like parts.

DETAILED DESCRIPTION OF THE INVENTION

Figure 1A:
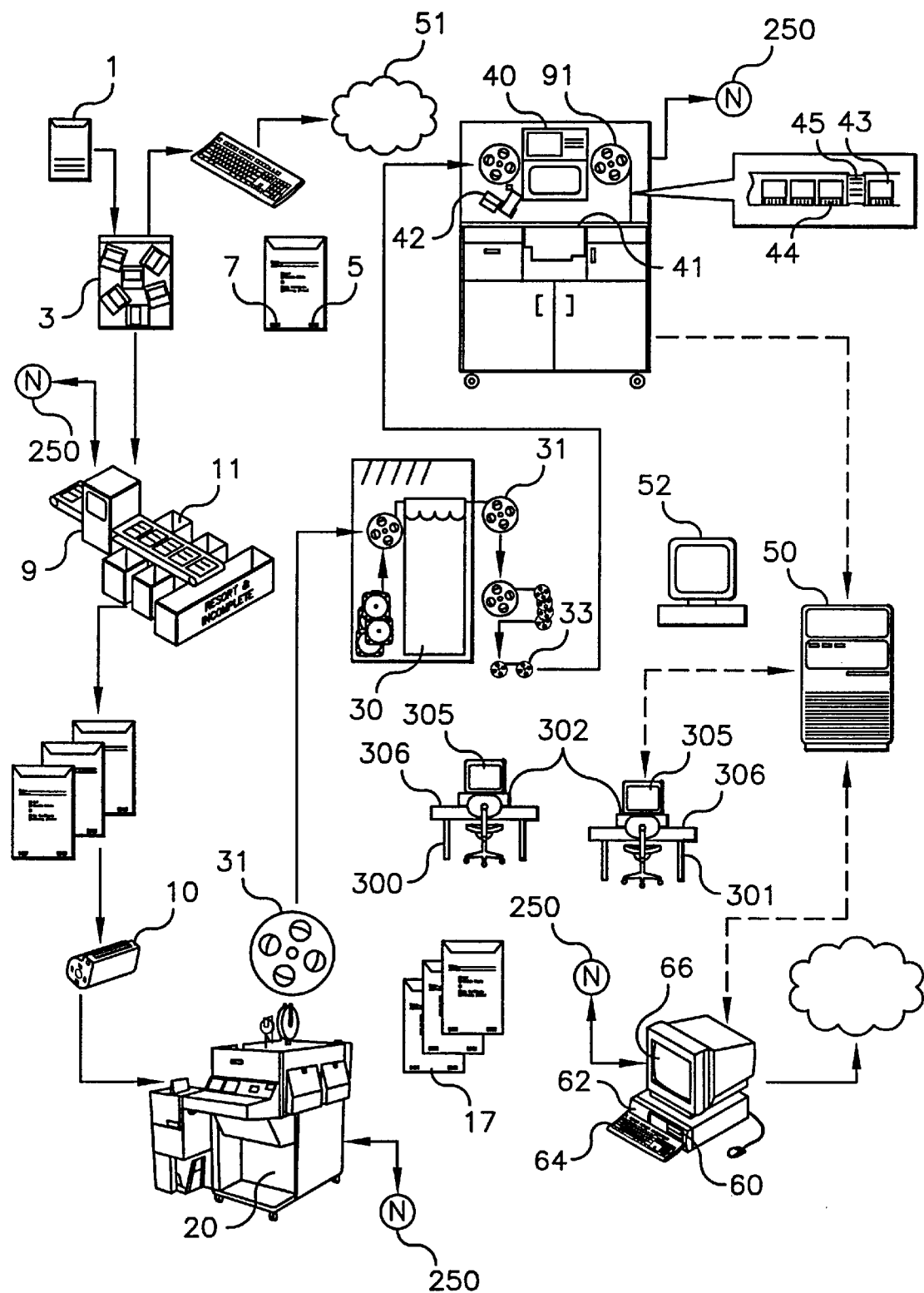
FIGS. 1A and 1B are a schematic view of an apparatus of the present invention, in the form of a photofinishing laboratory.

In the present application, an image "content identification" refers to an identification based on the identification of one or more objects in a scene captured by the original image. This has sometimes been referred to as image recognition. Scene objects which may be identified include real world objects such as people, animals, plants, machinery and equipment or other man-made objects (for example, buildings), or natural real world formations such as geographic features. However, the content identification, while being based on one or more objects in a scene could be, but need not be, simply one or more of the identified objects themselves. The content identification may be based on identifying not only one or more original scene objects, but also their configuration or interaction. For example, a "boy", "baby", "person", "car", and "boat" are all content identifications based on single elements in the scene of an image, and more than one such content identification may be made for a single scene of an image. Additionally, content identifications based on an action, configuration or interaction of one or more identified scene objects include "sleeping", "driving", "boating", "wedding", "funeral", "graduation", "cruise", "beach party", and the like. A "category identification" refers to some other identification which is generally unrelated to an image scene content (although it could be based on scene content). Examples of category identifications include, for example, the identification of a customer who owns the picture, an identification of a film on which the picture is captured, an identification of a photofinishing retailer where a customer brings a film for developing, or an indication from the customer that he does not want any certificates (e.g. a "privacy" indication from the customer). "Generating" a customer certificate refers, unless a contrary intention appears, to copying and/or transforming certificate data stored in memory into a form ready to be forwarded to an output device (such as a printer or communication module). However, as will be apparent below, the generated customer certificate may include data in addition to than that provided by the stored certificate data. As discussed below, a "customer certificate" references a type of certificate which has been generated in response to a customer image content. A "composite certificate" is one type of customer certificate which includes a customer image. A "default certificate" references a certificate which has been generated independent of customer image content. Reference to a "certificate" without more, includes all of the foregoing types of certificates. A "set" as used in the present application indicates one or more than one item, unless a contrary intention appears. When a second item is indicated as being "remote" from a first item in this application is referenced, unless a contrary intention appears, that second item is typically at least in a different building than the first item, or may even be more than one, more than five, or even more than one hundred miles away from the first item. It will also be understood that for a generated image content identification to "match" a stored image content identification, it is not necessary that the two identifications be identical. It is only necessary that the two have been predetermined to be corresponding identifications, for example through look up tables or some other database, or through an algorithm. For example, a generated identification may be "boy", but generated identifications for any or all of "boy", "girl", "man", "woman" could have been predetermined (and hence be a match for) a stored identification of "person". It will be appreciated that where data has been read or acquired by a device, this data will be in the form of a corresponding signal.

Figure 1B:
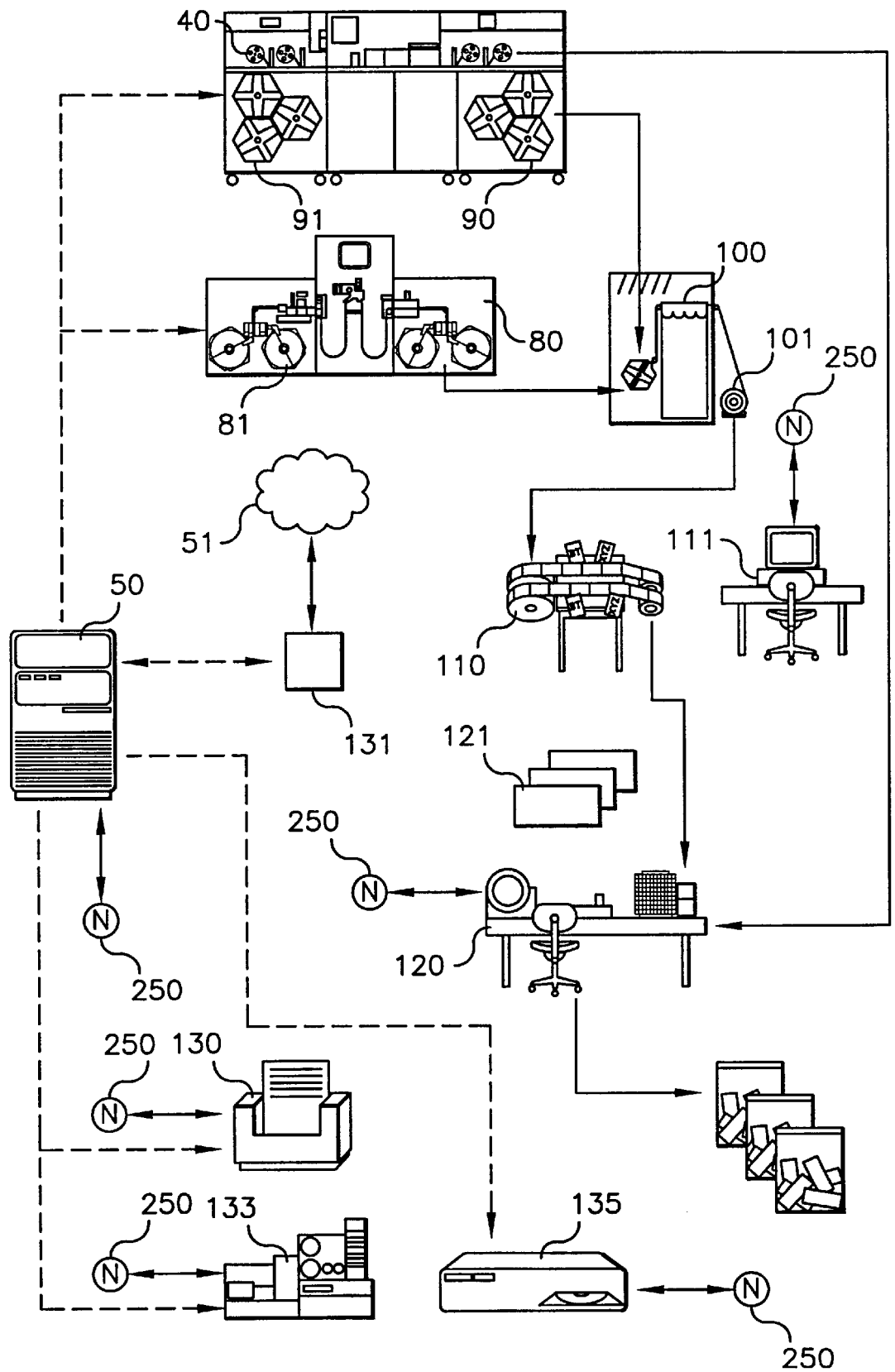
Figure 2:
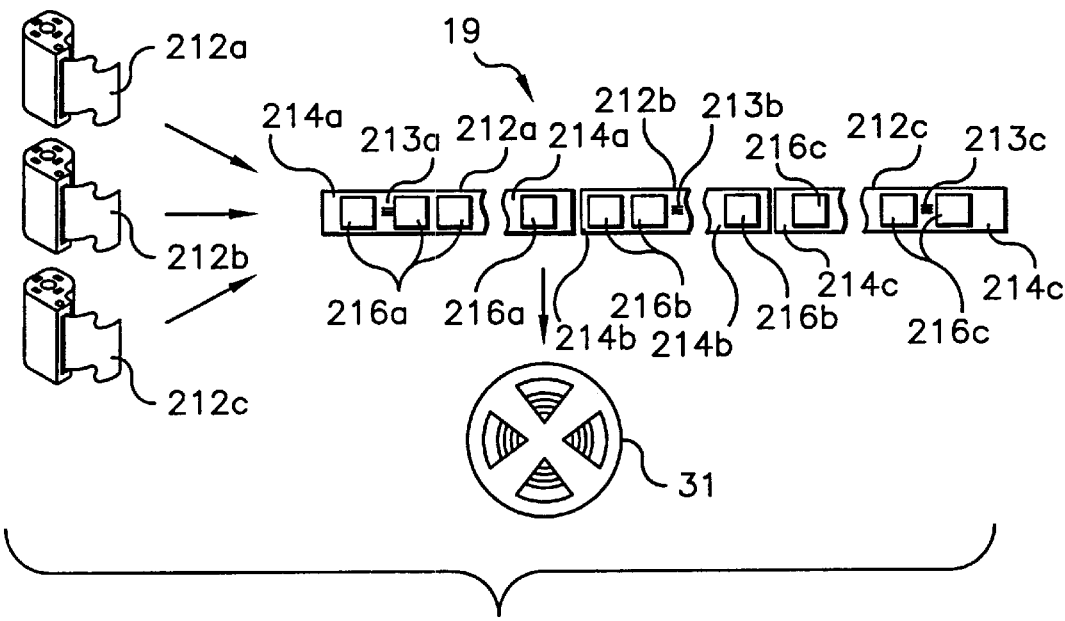
FIG. 2 illustrates in more detail, the result of a batching operation executed in the apparatus of FIG. 1.

Referring first to FIGS. 1A, 1B and 2 the illustrated photographic processing apparatus and a general photofinishing operation executed by such an apparatus will now be described. All of the apparatus of components of the apparatus of FIGS. 1A, 1B are typically in the same location, for example, in the same room or at least in the same building. However, different components of the apparatus could be located elsewhere with respect to other components provided provision was made for any transfer of physical items (for example, the films) and data transfer. Data flows in FIGS. 1A, 1B are typically indicated by broken lines or connection to a network 51 external to the apparatus of FIGS. 1A, 1B or connection to a network 250 which internally connects the components of the apparatus of FIGS. 1A, 1B. Physical transfers between components of the apparatus of FIGS. 1A, 1B such as movement of film or prints, have generally been indicated by solid lines between components. In the photofinishing operation a photographer (who is a "customer") submits to a retailer images on a medium which is typically undeveloped exposed photographic films, such as one or more films 212a. Each film 212*a* carries a plurality of exposed latent images 216 (for example, from six to twelve, to twenty-four, or to thirty-six images). The images on a given film may be regarded as a set of images, which term includes one or more images (although for most consumer films this will be more than one image). Films 212*b*, 212*c*, and other films (not shown) are also provided to the retailer by other photographers. It will be understood in the present application that a "customer", "consumer" or "photographer" is not necessarily the person who actually took the pictures, although it often will be, but includes any entity which provides the films for developing or receives the developed films. Films 212*a*, 212*b*, 212*c* are housed within cassettes 10 and may optionally carry optical or magnetic machine readable codes 213*a*, 213*b*, 213*c*, which may include within the same or a different code, a frame identification code 44 (see FIGS. 1A, 1B). Each film cassette 10 is placed into an envelope 1 by the photographer and the retailer places the envelope 1 into a route bag 3. Each envelope 1 has printed on it, associated unique envelope identifiers in machine readable code according to industry specification, the code including a retail store code 5 which identifies the retailer, and an envelope number 7. The retail store code 5 may be used as a "category identification code" discussed below.

Each envelope also has predefined information spaces 2 at which a customer can enter identifying information, such as his name and address, as well as a series of boxes 4*a* which a customer can request the adjacent identified product or service type (for example, particular sized prints, double prints, computer diskette carrying image signals from scanning the images, color reversal processing for slides, uploading of the image signals to an Internet accessible database, and the like). Additional boxes 4*b* and 4*c* are also provided as additional category identifications carried on a medium (specifically the envelope 1) associated with the customer image orders. Specifically, box 4*b* allows the customer to select a category identification of "No Certificates" while box 4*c* allows the customer to select a category identification of "Privacy, please!" which have the functions described below. Also, the particular envelope selected by a customer from among a plurality of possible envelopes at a retailer, may itself serve as a category identification as described below. For example, a retailer may offer different services as identified by the wording, color, or other indicia on the different bags. For example, some bags available at a retailer may have printing stating "KODAK PREMIUM PROCESSING" versus other bags which simply have "_____PROCESSING" where the blank is the name of the retailer. The "PREMIUM PROCESSING" label, when that bag is selected, identifies the associated film as a different category in that it receives a higher level of service than the film of the "_____PROCESSING" labeled bag. Route bag 3 is transported to a wholesale photofinishing laboratory (sometimes references herein simply as a "photofinisher" or "lab") which typically has, at the same location, all of the remainder of the components illustrated in FIGS. 1A, 1B and 3.

Thus, envelope 1 serves as a medium carrying one or more image category identifications associated with the customer image order. Other mediums could, of course, be used. Such could include a printed or magnetic label affixed or attached to each film cassette 10 or somehow otherwise associated with each film cassette 10.

At the lab route bags 3 and order envelopes 1 are sorted by retailer and service request type. Typically there are several hundred services available that must be sorted with the primary categories identifying the order or service request being color negative or positive film type, print size (equivalent to paper width), paper surface and weight, and number of prints each, with or without album presentation etc. Typically, workflow control also requires sorting envelopes for priority, category of service (which may be based on printing on the bag or other indicia as discussed above), delivery time, and retailer brand name to meet specific order completion needs within the lab; these factors primarily due to hardware configuration of the equipment in the lab and the need to keep common services and packaging within a given batch. The required sort for these categories can be performed manually or with an automated sorter. An automated sorter consists of a scanner section 9 that can read the envelope and decode the consumers instructions as indicated in boxes 4*a* and using that information, pass the envelope to an appropriate bin 11 where it is placed. Scanner section 9 can also read codes 5, 7 and the category identifications indicated by the consumer in boxes 4*b*, 4*c*. Consumer instructions, codes and category identifications are passed over a network 250 as signals collectively referenced as "order data", to a Lab Management System 60 ("LMS"). LMS 60 includes a processor in the form of suitably programmed general purpose digital computer 62, an attached operator interface in the form of a keyboard and/or mouse 64, and a CRT display 66.

When sufficient quantity of envelopes is present in a given bin 11, that bin 11 is transferred to a splicer 20 where each film cassette 10 is placed into splicer 20. Splicer 20 removes the undeveloped films 212*a*, 212*b*, 212*c* from their cassettes 10 and splices them together in a series by attaching one end 214*a* of one filmstrip 212*a* with an end 214*b* of another filmstrip 212*b*, and so on as shown in FIG. 2, to form one long spliced film. The spliced film formed from the films from a single bin 11 constitutes a "batch". A spliced reel 31 may carry one or more batches spliced together end to end, depending on the length of the individual batches. The now empty envelopes 1 from the single bin are placed together and a unique batch number is assigned by splicer 20 which is printed on a batch ticket 17. Batch ticket 17 is circulated in the lab with the empty envelopes 1 of that batch. Hereafter, within the lab, for all normal operations, the batch is treated as a single entity identified by the batch number and contains one or more consumer orders. At splicer 20 other category identifications for a batch can be entered by an operator and also sent to LMS 60 through network connection 250. Such other category identifications can include those category identifications not earlier read by scanner section 9, such as service category based on envelope indicia which can be manually entered by an operator into splicer 20.

The films of a spliced reel 31 are attached to a film developer 30 for development. In developer 30 films 212 are then chemically developed through a series of chemical processing steps, in a known manner, to yield permanent visible images from latent images 216. Each filmstrip 212 will typically be a negative type filmstrip yielding negative type images on a transparent base after developing by developer 30, although filmstrips 212 and developer 30 could be of a kind which produce positive transparencies (that is, slides), also in a known manner. After development, if a reel 31 has more than one batch on it, then reel 31 is broken-down and re-established as individual batches 33.

Film batches 33 are then sent to a scanner unit 40 which is equipped with an image scanner 41 for the generation of digital image signals corresponding to developed images 216. Image scanner 41 scans images at a rate of about 200 images/minute or greater. Scanner unit 40 also has a data reader 42 which reads a frame identification code 44 and a splice identification code 45 which separates each customer order. Data reader 42 can also read optical or magnetic codes recorded on film 12. Image scanner 41 includes a film gate at which each image 16 of films 12 can be successively positioned to receive light from a light source, which then passes through image 16 and a subsequent lens system to fall upon an image sensor. The image sensor can be a line sensor or area array sensor. Appropriate electronics (including an analog to digital converter) in the scanner 41 convert the sensor signals to digital signals. The output of scanner 41 then, are digital image signals corresponding to each image 16 on each film 12 of each batch. Scanner 41 should be capable of scanning images 16 with a reasonably high resolution, such as at least 400×200 pixels over the area of images 16 (such as at least 600×400 pixels) and preferably at least 1000×1500 pixels (and most preferably at least 2000×3000 pixels). Scanners of the foregoing type are well known in the art and need not be described further. Scanner 41 can also provide image characteristic data on such characteristics as image density, color balance, or contrast. This data can be obtained from scanned image signals provided by a separate lower resolution scanner section (not shown) within scanner 102, or can be generated from the previously obtained higher resolution image signals. Thus, the scanned image signals from which prints will eventually be obtained, need not be (but preferably are) the same image signals from which the image characteristics are obtained. Alternatively, such image characteristic data can be generated in an Image Data Manager ("IDM") 50 described below, from image signals.

Data reader 42 can also obtain from film 212, other category identifications encoded magnetically or optically on film 212. For example, such further identifications may include machine readable film manufacturer code (in the form of a latent image bar code on the film), date of image exposure, picture taking conditions, format of desired print (for example, landscape, portrait or standard sized prints), a user "Privacy, please!" indication, and the like. These category identifications along with any other category identifications are sent over network 250 to IDM 50, along with image signals (and optionally image characteristic data). The IDM 50 and/or LMS 60 keep track of all received category identifications and the batches, customer orders, or individual images with which they are associated.

IDM 50 includes a processor and a connected monitor 52 which allows an operator to view various operating parameters of IDM 50. IDM 50 may, for example, be a number of general purpose microprocessors operating in parallel and suitably programmed to execute the required steps of the method of the present invention, or may be equivalent hard wired circuits in whole or in part. It should be noted in the present invention, that where any programmed processor or computer is referenced, programming can be achieved in any of known ways. For example, the program can be provided from a computer readable storage medium. The computer readable storage medium may comprise, for example: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium which might be employed to store a computer program.

IDM 50 is connected through network 250 with image preview stations 300, 301 of the same configuration, and a high speed digital printer 80 and an optional optical printer 90. Various output devices are connected to IDM 50 over network 250, including optical disk writer 135 (for example, a photo CD, CD-ROM or Digital Video Disk drive), magnetic floppy disk writer 133, printer 130, or remote communication module 131 which allows communication of digital images to a remote terminal through a suitable network 51 (which may be wire, fiber optic cable, or wireless), such as the Internet or telephone. By "remote" in this context, is referenced a terminal which is typically at least in another building, or which may more than one, more than five, or even more than one hundred miles away from IDM 50. Such output devices fulfill a customer order by providing the customer requested image product incorporating one or more images of the order (for example, prints produced by printer 80 or 90) or service using one or more images of the order (for example, uploading images to a particular remote computer through communication module 131). Image preview station 300 may include a computer 302 (containing a processor and a memory to which the processor has access) and connected display 305 (sometimes referenced as a display) and operator input device 306 in the form of a keyboard and/or mouse, microphone, and/or other suitable operator input device. Alternatively or in addition, operator input can be provided by display 305 being touch-sensitive. Computer 302 is optional in the sense that functions performed by it can be performed by IDM 50. Display 305 may, for example, be a CRT or LCD screen. Preview station 300 provides its output, as described below, back to IDM 50 through network 250. Image preview station 301 is of the same configuration as preview station 300.

When optional optical printer 90 is used, developed and scanned film batches 33 will be physically transferred from developer 30 to optical printer 90. The required settings for optical printer 90 (for example, exposure time and color balance settings) can in this case be provided by IDM 50 using the scanned digital images received from scanner 41 and known algorithms for determining such settings from the scanned digital images. When digital printer 80 is used, IDM 50 formats the digital image signals received from scanner 41 into a suitable format for digital printer 80. Further, IDM 50 can perform enhancements to such digital image signals before printing, such as color balance, density correction, image warping or any other digital image manipulation which a customer may find desirable (such indications may come from the customer indicating a preference for them on envelope 1, such as by checking appropriate boxes 4*a*). Digital printer 80 may, for example, be a high speed color laser printer which prints image signals received from IDM 50 on a light sensitive photographic paper web. Exposed photographic paper from printer 80 (or from optical printer 90) is then transported to, and chemically developed in, color paper developer 100 to yield fixed images on the paper, in a known manner. The web 101, following development is first transported to an inspection station 110 at which an operator checks the quality of the printed images. From the inspection station 110, the web 101 is transported as a roll to a finishing station 120 to which the scanned developed film batches 33 are also sent (either directly from developer 30 when the preferred digital printer 80 is used for printing, or from optical printer 90 when that printer is used for optical printing of film batches 33). At finishing station 120 the paper web is cut into individual image prints 121, each film of the film batches 33 is cut into strips (for 35mm film) or reinserted into a cassette 10 (for Advanced Photo System film), and the prints mated with the corresponding film 12 to complete each customer's order. It will be appreciated that in the present invention, image signals may be obtained from other than from a scanned photographic media. For example, image signals might be provided to IDM 50 by being read from floppy disks or optical disks (in which case writers 133, 135 could be readers as well as writers), or received from the Internet or other network over communication module 131. Such image signals can be handled by IDM 50 and preview station 300 in the same manner as image signals received from scanned photographic media.

Figure 3:
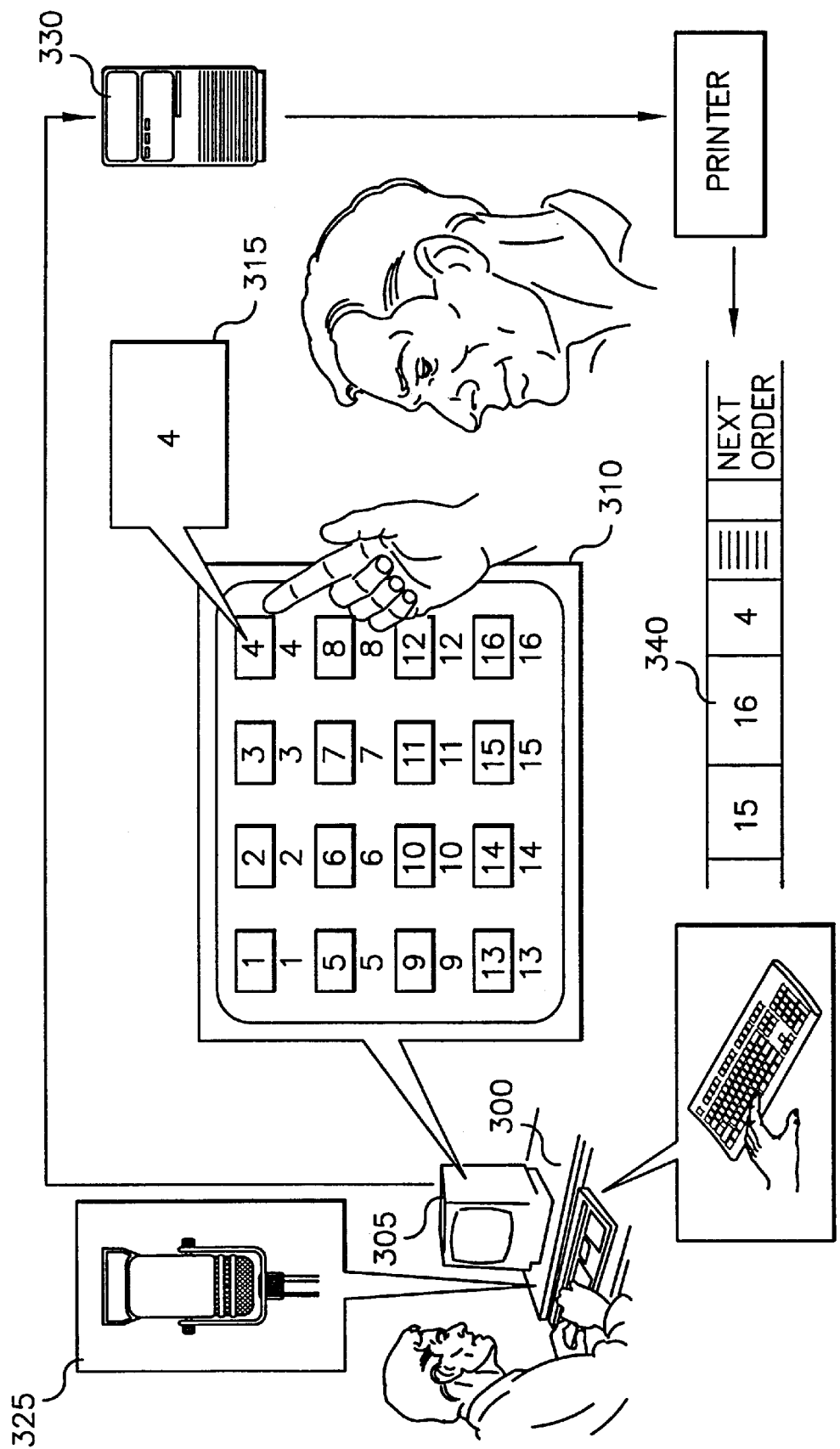
FIG. 3 illustrates one way of determining image content in the apparatus of FIG. 1.

Referring now to FIG. 3, the preview station 300 and its operation will now be further described. Preview station 300, under control of IDM 50, displays simulated images corresponding to the images 16 on a film 12. Again, each customer order is typically a single film 12 and, even if a single individual submits more than one film 12 for processing, each film 12 is typically placed in its own corresponding envelope and treated as a single customer order. After scanner 41 has captured the digital image signals corresponding to images 16 on a film 12 and communicated them to IDM 50, IDM 50 generates simulated images corresponding to images 16 based on the received digital image signals. The simulated images are typically low resolution versions of the digital image signals received from scanner 41, and may be referred to as "thumbnails" or "imagettes". IDM 50 causes simulated images corresponding to the scanned images of a customer order to be shown as imagettes on display 305 for viewing by an operator. A typical presentation of such imagettes on display 305 is illustrated as screen 310 in FIG. 3. The operator visually reviews the displayed screen 310, and for orders with identifiable subject matter, the operator would identify a content descriptor for one or more of the images. For example, in FIG.3 a "baby" is identified and associated with the imagette identified as image frame number 4 (which shows a baby as all or part of the image content). The content descriptor for a given image may be entered into computer 302 by touch sensitive display 305, or other operator input device 306. If the operator input device 306 is a microphone 325 then computer 302 or IDM 50 is suitably programmed with voice recognition software to recognize at least spoken words from a list of content words stored in a memory of either. The input device then, can be considered an image content identification generator for the images of an order, which generates image content identification signals, in response to operator input (usually after viewing the respective images), for one or more images. Such generated image content identifications for one or more images of a customer order are compared by computer 302 or IDM 50 with a list of predetermined different image content identifications previously stored in a memory of computer 302 or IDM 50. This stored list additionally has different predetermined customer certificate data stored in association with the respective content identifications. An example of such a list is provided in Table 1 below:

TABLE 1

| Initial Content ID Selected by Operator | Subsequent Content ID Selected in Response to Displayed Choices | Certificate Data |
| --- | --- | --- |
| Baby | Portrait | Frame |
| Baby | Newborn | Enlargement |
| Baby | Playing | Toys |
| Vacation | | Panorama Poster Print |
| Family Reunion | | Upload to a specified remote database |

Note that the above list includes two content identifications, which are used as described below. The "certificate data" can include just instructions for any product and/or service, including generating text or templates for printing, or image processing instructions which cause the customer image with the matched content identification to be modified in a way specified by the instructions, or combinations of the foregoing. When at least a generated image content identification (for example, "baby") matches a stored image content identification (in the example, "baby"), a customer certificate may be generated by computer 302 or IDM 50 based on the stored certificate data associated with the matching stored image content identification. In a preferred embodiment, when there is a match between a generated and a stored image content identification for a given image, computer 302 or IDM 50 generates the customer certificate by merging the stored certificate data with that image (such a generated customer certificate sometimes being specifically referenced as a composite customer certificate). The generated customer certificate is ready for output to digital printer 90 or alternatively, an auxiliary customer certificate printer (not shown). During the merging stage to form the composite customer certificate, the customer image can be used as is, or optionally altered in any way desired. Collating is automatic if the customer certificate(s) is printed sequentially with customer requested image prints (sometimes referenced as "service prints") of a given customer order on the same printer. For example, immediately preceding, immediately following, or intermediate within, the series of customer image prints of the order containing the image which prompted generation of the customer certificate. This occurs if the customer certificate is printed sequentially on the same web as customer service prints (as shown in FIG. 3), or on different sheets of a cut sheet printer. If the customer certificate is printed on an auxiliary printer or otherwise not printed sequentially with the customer service prints, it will be appreciated that some method of collating (e.g. manual) a printed customer certificate with the fulfilled corresponding order, should be provided. By the "corresponding" order here is referenced the order containing the image which prompted generation of that certificate (following matching of the content identifications). Methods of collating individual order components in a photofinishing laboratory are well known, and any of these could be used.

The logic of generating customer certificates will now be illustrated with reference to FIGS. 4 and 4A–4C in particular. As previously described, upon completion of scanning a batch (400) IDM 50 acquires the data required for review of the order by an operator that data being the image data (401) from scanner 40, any category identification data (420), such as category identification data (415) or (410) from either the lab management system 60 or from splicer 20. The originating source for the category identification data is the envelope data (405) obtained from envelope 1 (specifically, boxes such as boxes 4b, 4c on envelope 1) or film data (406) obtained from data reader 42 by reading optical or magnetic codes 213 on film 12.

Figure 7:
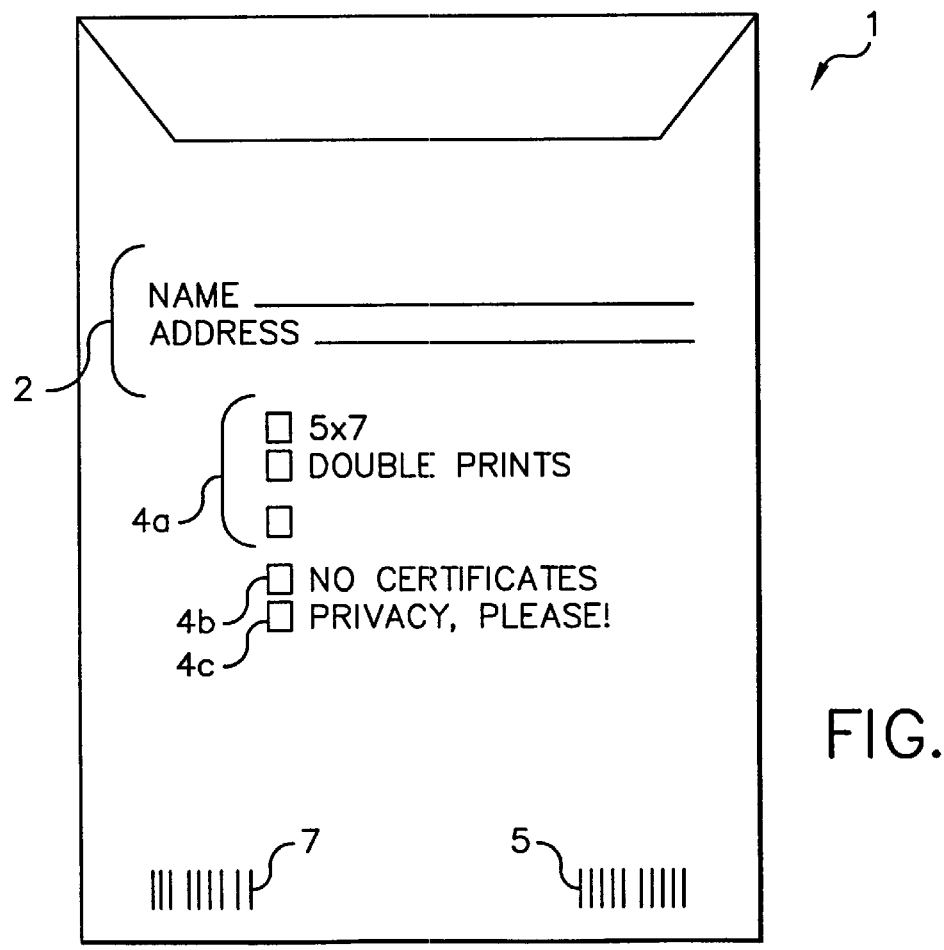
FIG. 7 is an enlarged view of a customer image order envelope illustrated in FIG. 1.

Rules for viewing the order (440) are applied in a parallel logic processing manner. If a consumer requests that images not be viewed by an operator by checking predetermined category identification box 4c on envelope 1 ("Privacy, please!"; see FIG. 7), such a category identification is recognized by computer 302 or IDM 50 as a predetermined privacy category identification such that no simulated images for any of the images 16 of that customer order are shown on display 305. Instead, IDM 50 passes the customer order data (which includes the digital images corresponding to images 16) without any viewing at preview station 300, directly to the block designated Image Composition Manager (480) for preparation for printing. The Image Composition Manager ("ICM") is suitable software running on IDM 50. Other category identifications may be generated, for example, from scanner section 9 based on envelope codes 5, 7. Such generated category identifications are compared (426) with a stored list of category identifications in the memory of IDM 50, and any particular commands (including permissions or restrictions) associated with the generated category identifications in memory are determined (426). Generation of a customer certificate is further a function of any received image category identifications. For example, as discussed further below, a category identification could cause a certificate not to be generated even if there was at least a match between a generated and a stored content identification, or a certificate could be generated from the stored data but which was modified depending upon the category identification.

In practice there would be permissions and restrictions associated with each batch or customer order. For example, an "economy service batch" for develop and print may not offer certificates whereas a batch identified as "premium" might. Batch data (410) from splicer 20 associate with a batch would carry a category identification indicating that. Additionally a category identification indicating an order which originated with retailer #1 may be predetermined to indicate that a certificate describing a product or service for retailer #2 should not be generated, or must have additional database correlations allowing those associations. Thus the need for the retailer identification. In this description, a retailer is considered to be the supplier of the photographic develop and print service, and a service provider could be either the retailer or another individual or corporation offering a product or service in the form of a certificate. The category identifications that are used by the IDM 50 to determine service applicability and allowable certificate selections, have been previously stored in memory. Standard relational database structures using well known procedures are used to associate the previously stored predetermined dealer identifications ("IDs") (421), service providers IDs (422), content IDs (423), and certificate element IDs in hierarchical lookup tables (424, 425).

Before each batch is viewed by an operator, the orders go through a process of relating permissions or restrictions via a database lookup function (426), which ultimately relates the originating retailer IDs from the consumers film order to the certificates supported by that retailer or other service provider. When more than one preview station 300 is used in parallel, the operators can be trained for reviewing orders from respective retailers. In this case, IDM 50 will send to that preview station only simulated images from the retailers for which the operator is trained. If the batch or orders pass (440) predetermined viewing rules, each order (444) in succession is selected and displayed to an operator (445) at their viewing station. The viewing rules may include not displaying any simulated images for a batch or customer order if the various permissions or restrictions conveyed by category identifications do not allow for the generation of any certificate from stored certificate data, as for example when a "No certificates" or "Privacy, please!" category identification is received.

As the images comprising the frames in an order are displayed, an operator identifies an image content (450) and a specific image (470) associated with the content. Using known methods (voice recognition etc. modules) a content ID (451) is generated by the computer. Each content ID has further lookup table associations (452) that provides some leniency for the operators content identification, for example an operators identification of a "child" may allow for a resultant generated content ID of "children", "boys", "girls", etc. In such a case where similar identifications or a hierarchical relationship could be associated with the one an operator chose, a subsequent content ID (such as shown in TABLE 1 above) may be required of the operator to narrow or restrict the choice of resultant content identification. In this case, further possible subsequent content selections can be displayed for the operator on display 305 prior to generating a content identification signal in response to operator input.

With all the permissions available and a content identification received, the IDM 50 now applies a routine that compares the predetermined content IDs with the generated IDs (460). If a match is present (463), the IDM identifies the predetermined certificate ID (424) or (425) as being associated with the specific image the operator previously associated with the content. IDM 50 then generates (471) a unique ID (the "image composite ID") which is linked with the image frame ID data from step (470) and with the certificate data from (424), (425). It will be appreciated that one or more images, with the same content ID, can be linked with the same certificate data for later merging. This image composite ID and the image frame ID and certificate data are stored in a database. The image composite ID alone then, allows one to retrieve the associated image and certificate data.

If no match is present, the operator is provided with two options at step (461), which can be displayed to him on display 305. In one option, he can select to have a default certificate given to the customer (466), in which case the order is passed to step (471) to create an image composite ID and subsequently to the image composition manager (480). The default certificate can be generated from any data predetermined to be used in this case. In this case the IDM identifies the default certificate ID (425a) as being associated with the image. In another option, the process of content identification could be repeated (465) when an initial content identification failed to result in a match, or when a number of certificates are initially indicated for issuance within a given order but it is predetermined that each order should receive some other different number (which may be either greater or less than the initially indicated number). Thus, if the predetermined number of certificates for an order is greater than the initial number indicated for issuance based on the operator's initial content identification, then IDM 50 will have the operator select further content identifications for images of that order. Alternatively, if the predetermined number is less than the initially indicated number, IDM 50 will have the operator narrow the content identification for one or more images so that fewer certificates will then be indicated for issuance. Each order that is allowed to be viewed within a batch goes through the process from step (444) until all orders within a batch have been viewed.

Also, upon completion of the order reviewing for image content, the operator would have the opportunity to view the completed composite certificate(s). Through the previewing station 300, the operator can initiate an optional order review routine (481), and in the image composition manager (480) processing is executed that creates a composite certificate(s) by merging the stored certificate(s) and associated customer image data to generate and display an image of the composite certificate(s) to the operator (482) on display 305. The operator can, through additional actions, apply modifications (483) or approval (484) of the composite certificates to be printed.

After step (480), the method loops back to step (443), as necessary, until all the customer orders in a given batch have been processed.

Following operator approval in step (484) (if optional review was initiated by the operator) or following creation of image composite IDs in step (471) (if optional review was not initiated by the operator) the Image Composition Manager creates a digital image file where each image within the batch is placed in the sequence of scanning (494). The completed order (including scanned image data 401 and any composite certificate(s)) is passed (495) to an output manager (498) that controls the format and flow of data to digital printer 80 to print (499) both the service prints and composite certificate(s).

The image that is presented on the certificate would most likely be the image the consumer captures, however, the image or elements within it may be altered in some manner such as zoomed, cropped, rendered as black and white, and the like. Such changes may be initiated automatically by the stored certificate data, as mentioned above. Alternatively, this can be done manually by an operator. The process for that begins with the operator review of the composite (481). Upon operator command to view the image, the image is displayed to the operator (482). If the operator selects to modify the image (483) a rendering format that allows image manipulation (485) is called. In a manner typical of computer applications providing image alteration/rendering, the operator selects whole or portions of the elements of the image (486), selects image operators from the image manipulation application (487), and applies them (488). The resultant image is re-rendered and displayed to the operator and saved. Through operator commands the image is converted to a compatible format and sent to the image composition manager as the 501 or as an additional image 510 to be used in the composition certificate.

Figure 4:
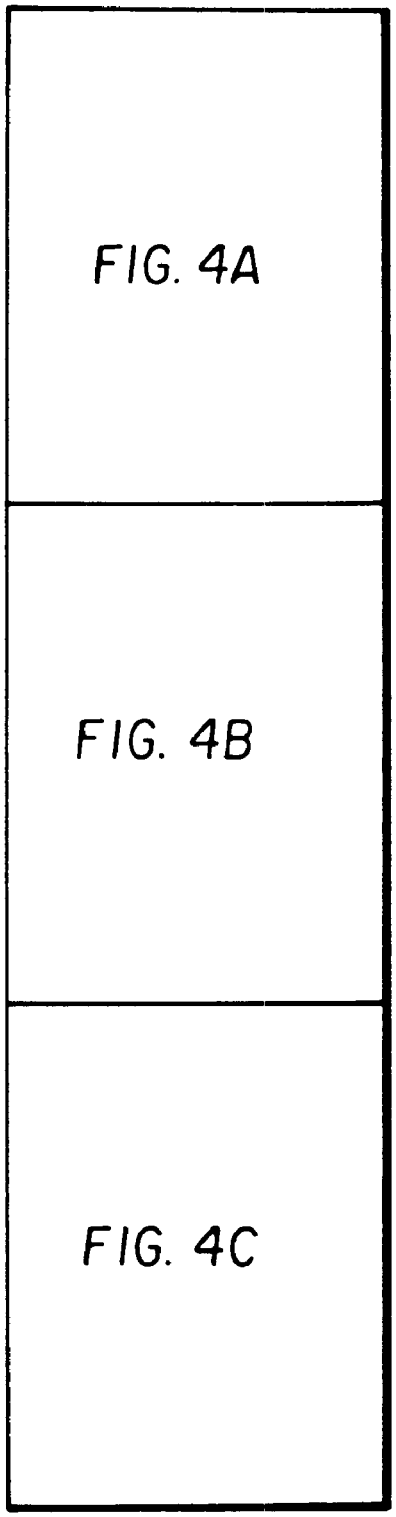
FIGS. 4, 4A, 4B and 4C represent a disclose a flowchart illustrating a method of the present invention.
Figure 4A:
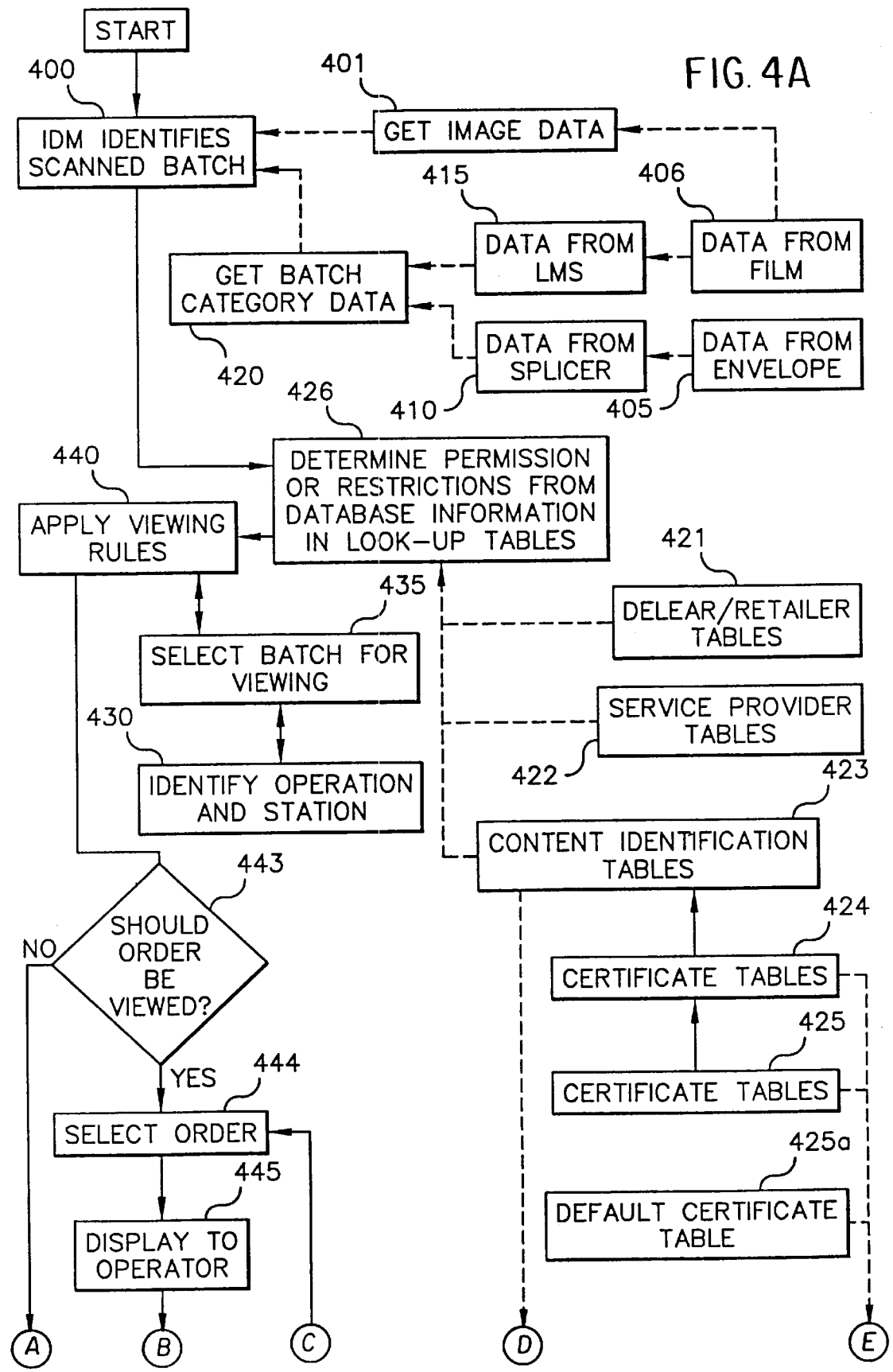
Figure 4B:
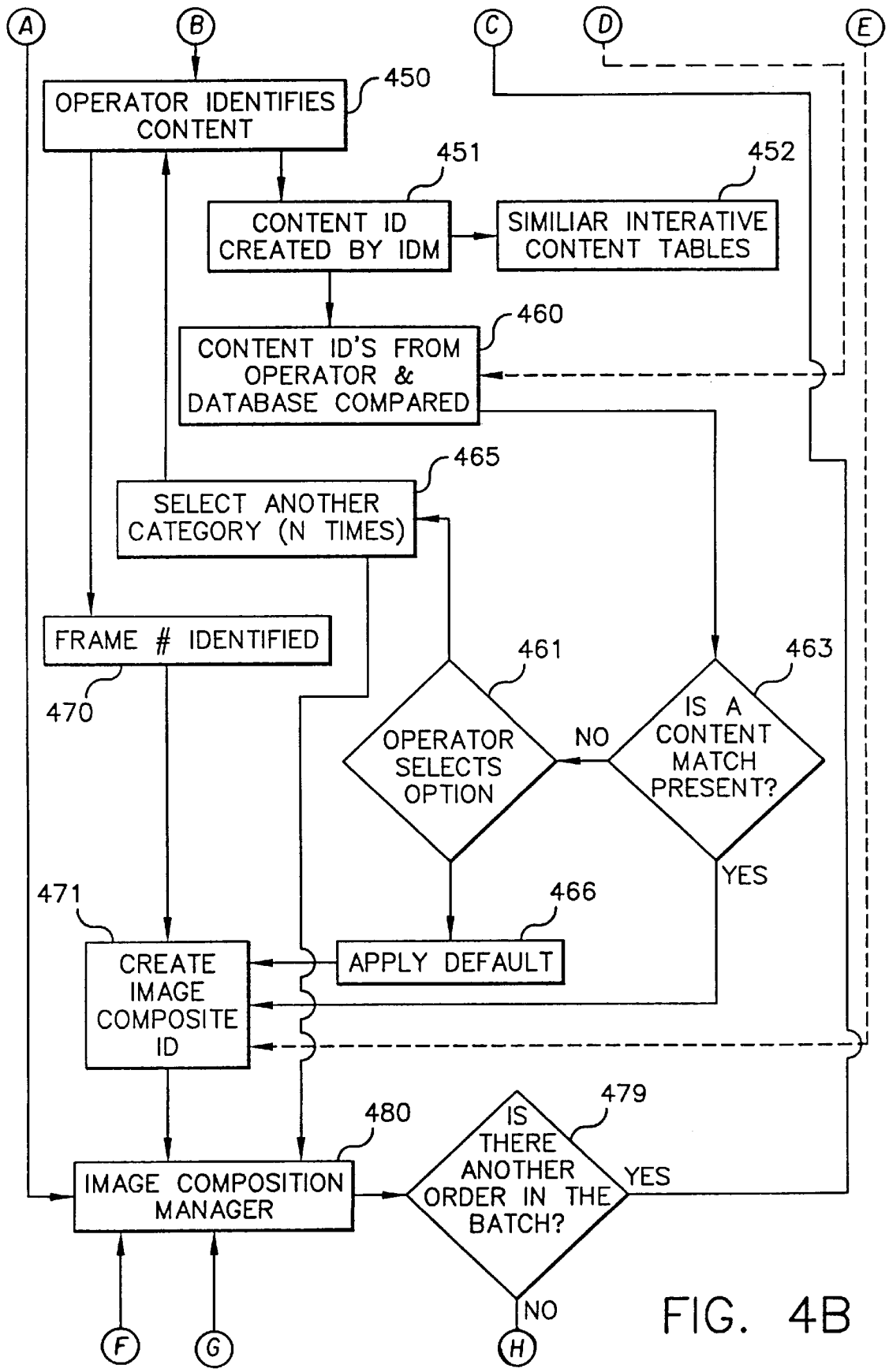
Figure 4C:
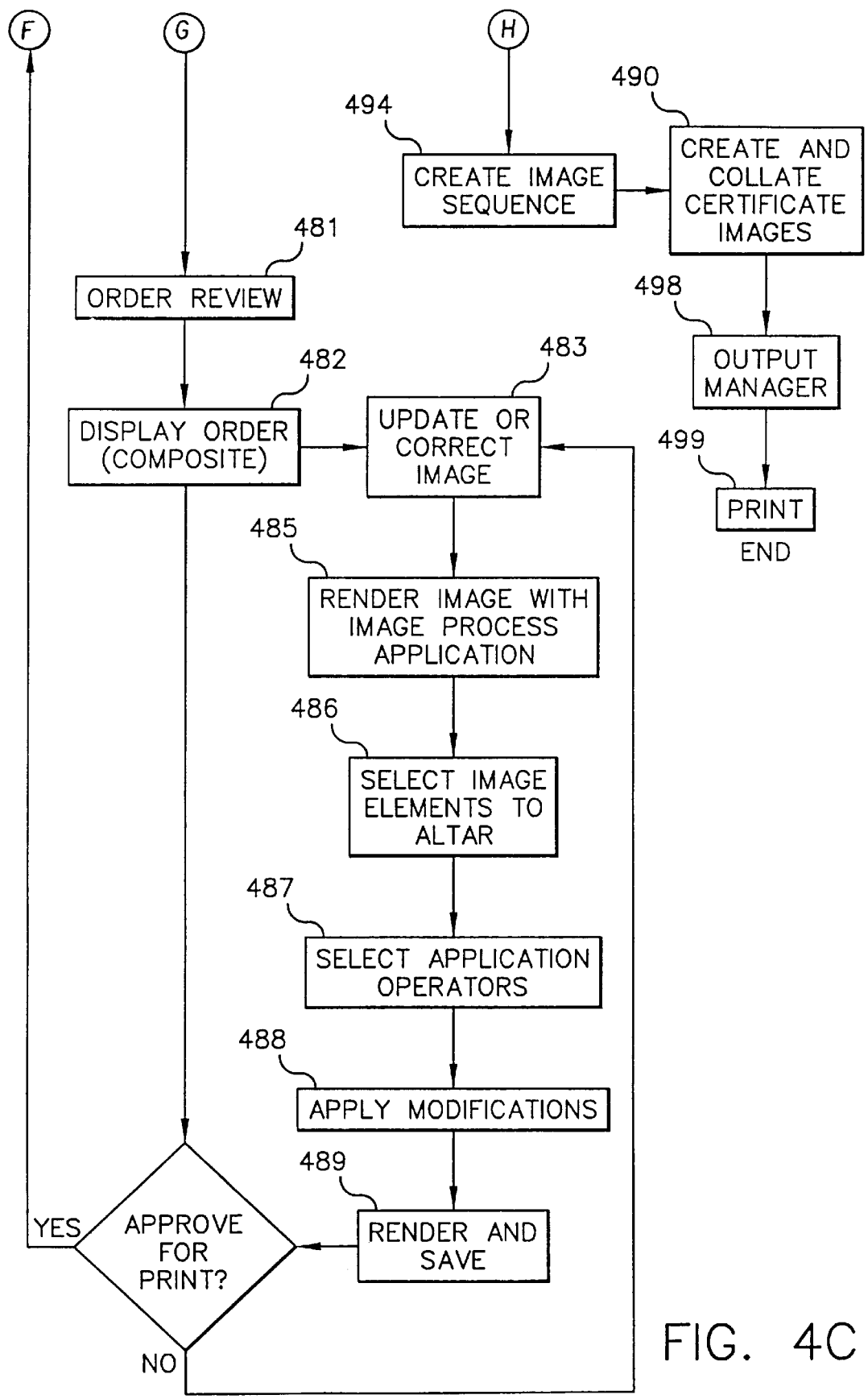
Figure 5:
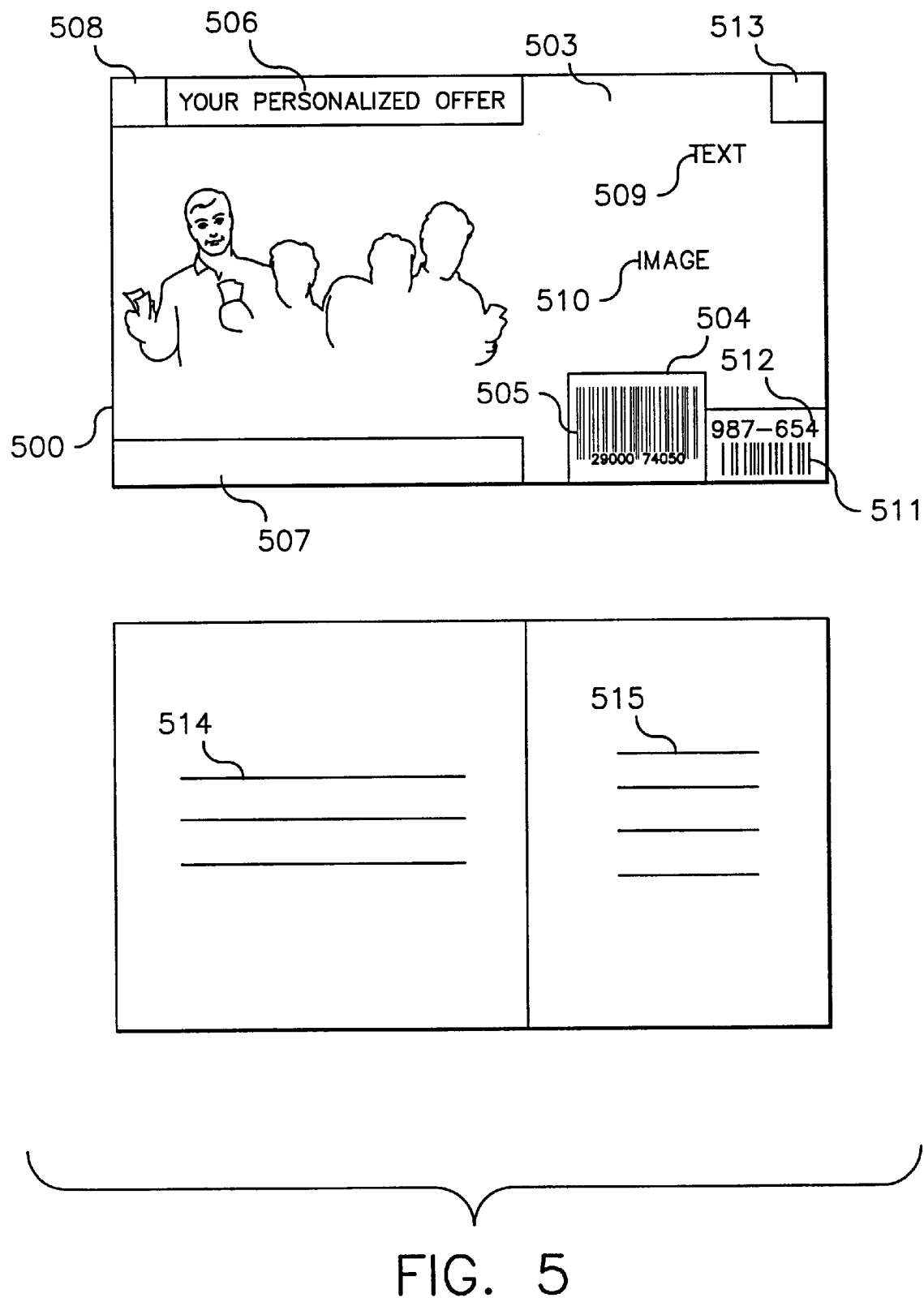
FIG. 5 is an enlarged view of a customer certificate as produced by an apparatus and method of the present invention.

Referring to FIG. 5, an example of a typical composite customer certificate 500 generated by the method of FIGS. 4 and 4A–4C is illustrated. The certificate includes, on a front side, the customer image 501 which prompted generation of the certificate (that is, the customer image from which a content identification was generated which corresponded to a saved content identification in memory). An information portion 503 is part of the composite certificate, and includes a text message 509 and, optionally, an image 510. Message 509 and image 510 are typically generated using the stored certificate data (although not all of the information used to generate message 509 and image 510 need be part of the stored certificate data). Message 509 and image 510 may, for example, be messages which suggest the customer purchase a product or service which may or may not include image 501 or another image of the customer order containing image 501. Additional messages 506, 507 can be provided on the customer certificate, which provide the customer with information about the certificate (for example, how to use the certificate). Retailer logo 508 and a service provider logos 513 can also be printed as part of the customer certificate. Messages 506, 507 and logo 508 will typically be standard messages which are added to all printed composite certificates, while service provider log 513 will typically be generated from stored certificate data. When certificate 500 is printed, optional backprinted information to the consumer can be provided via imprinting (514) and (515).

The customer certificate of FIG. 5 further includes a unique identification of the customer order (in particular, a unique identification of customer image 501) which prompted generation of that certificate. Such indication is provided in both machine readable bar code 511 and corresponding human readable characters in the form of visually readable alphanumeric code 512. These codes 511, 512 can include a film splice ID for conventional 35 mm film, or an APS Film Identification Code in the case of more recent "APS" type films. The unique identification of codes 511, 512 then, is associated with and identifies the image set of a customer order (since it will typically uniquely identify the customer film 12 from which it came), and more particularly is associated with the specific image 501 since it will further typically identify the image frame within the identified customer film 12. However, the image frame number for image 501 or another image of the order could alternatively be provided by the customer by visually reading the frame number on a typical film negative, index print, or elsewhere.

The printed certificate further includes image composite ID bar code 505 and corresponding alphanumeric code 504 as generated by step (471) in FIG. 4. Thus, the image composite ID alone provides access through the database accessible by IDM 50, to the customer image signal for image 501 (and also other images of the customer order) and the corresponding certificate data (which includes an indication of the product or service being offered). Therefore, when the certificate data included a modification of the customer image used to obtain the hardcopy image 501, the image composite ID codes 505, 504 include a reference to the algorithm which made that modification. So when a customer presents certificate 500 to obtain the product or service identified thereon, the same algorithm used to generate hardcopy image 501 can be automatically used to produce the product or service. Alternatively, but less preferably, codes 505, 504 could themselves contain the instructions for a product or service and at least parameters for the algorithm used to modify image 501 (while codes 505, 504 could actually describe the algorithm, this would make codes 505, 504 very long).

Figure 8:
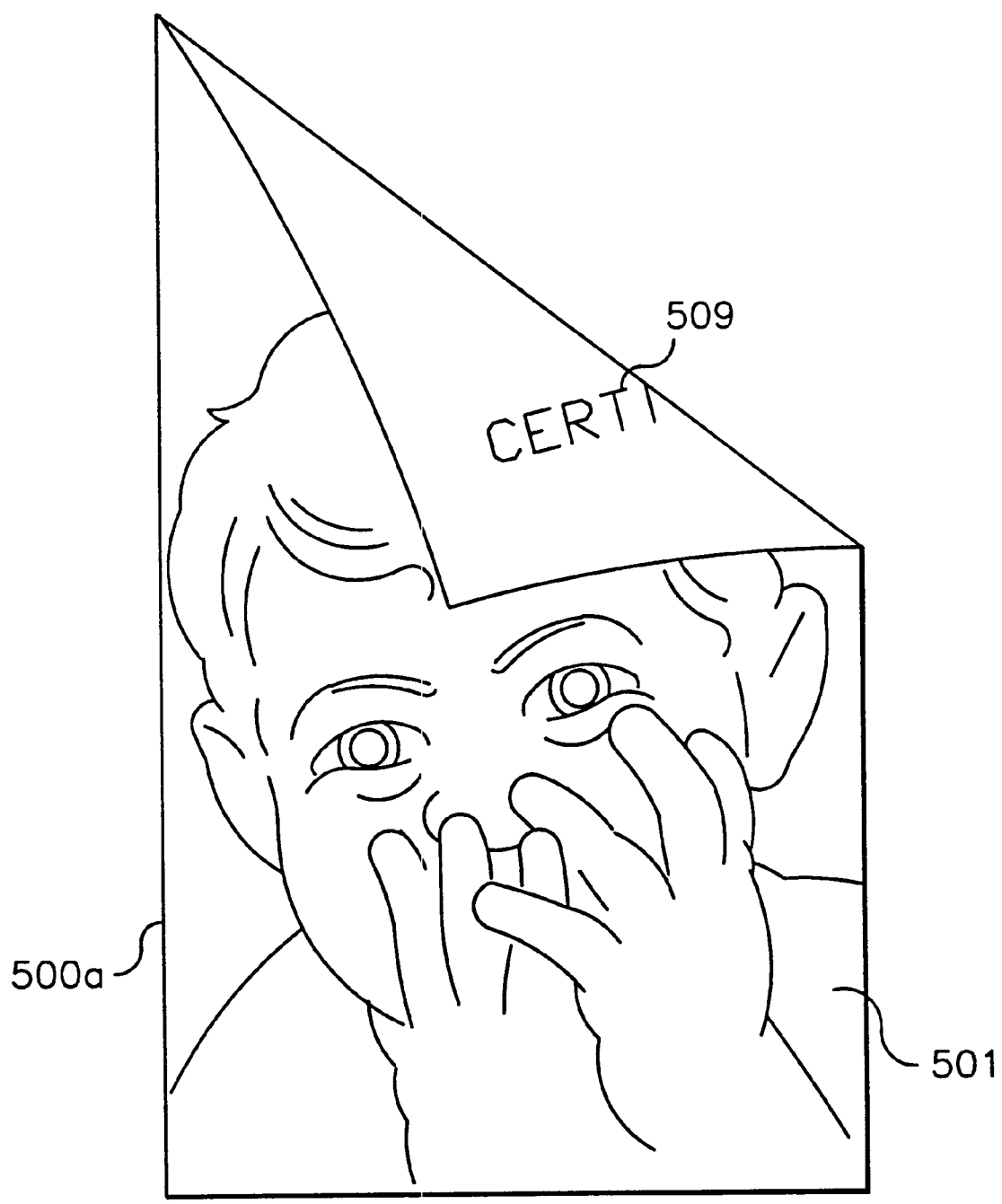
FIG. 8 is an alternative customer certificate of the present invention.

An alternative customer certificate 500a is illustrated in FIG. 8. This certificate is essentially the same as that illustrated in FIG. 5 except the information portion 503 has been printed on the back side of a printed image of the order, in particular the back side of a customer service print of the image 501. This may encourage customers to retain the certificate since most customers will not want to throw away a service print of their image.

Figure 6A:
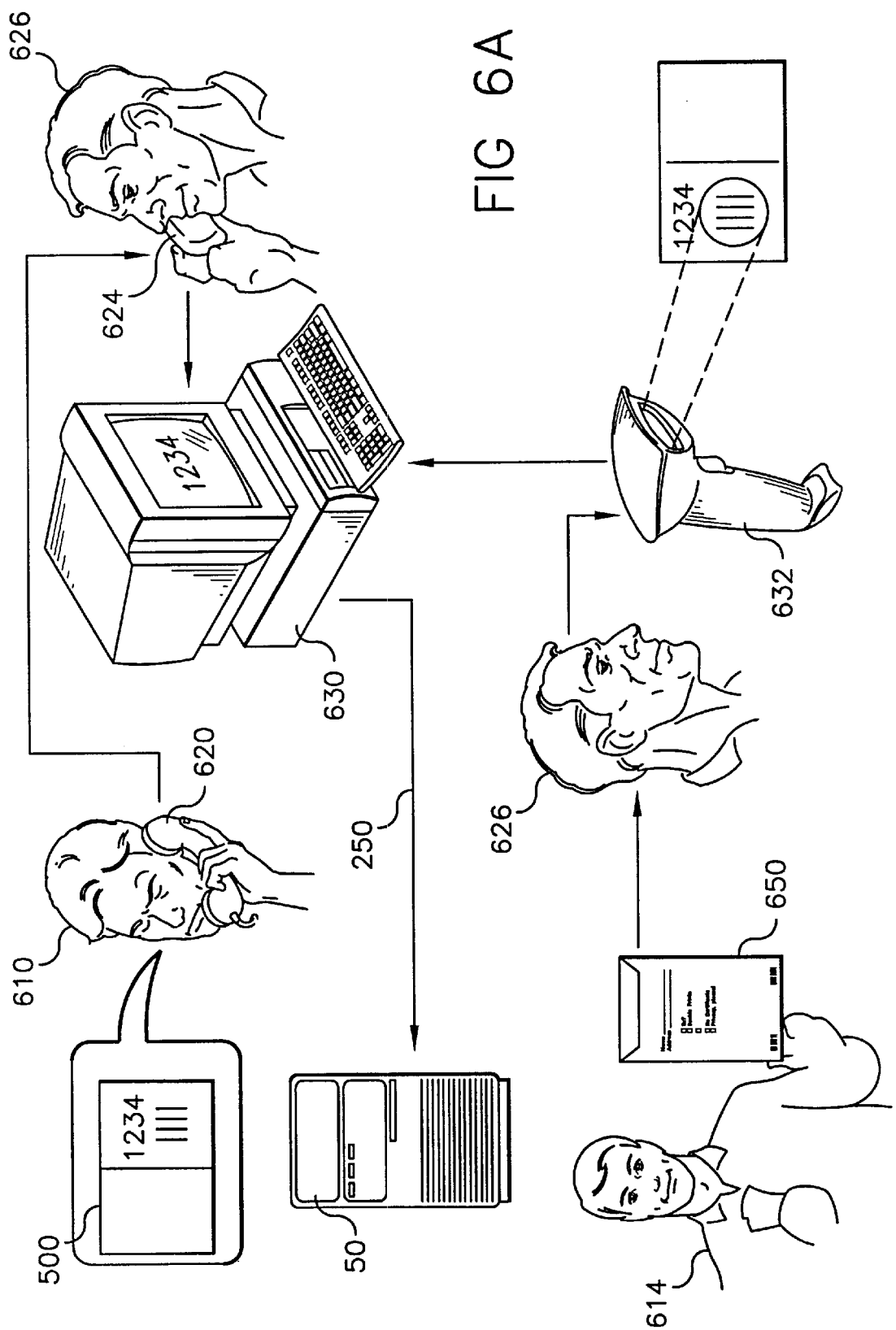
FIGS. 6A, 6B illustrate use of a particular type of customer certificate of the present invention.
Figure 6B:
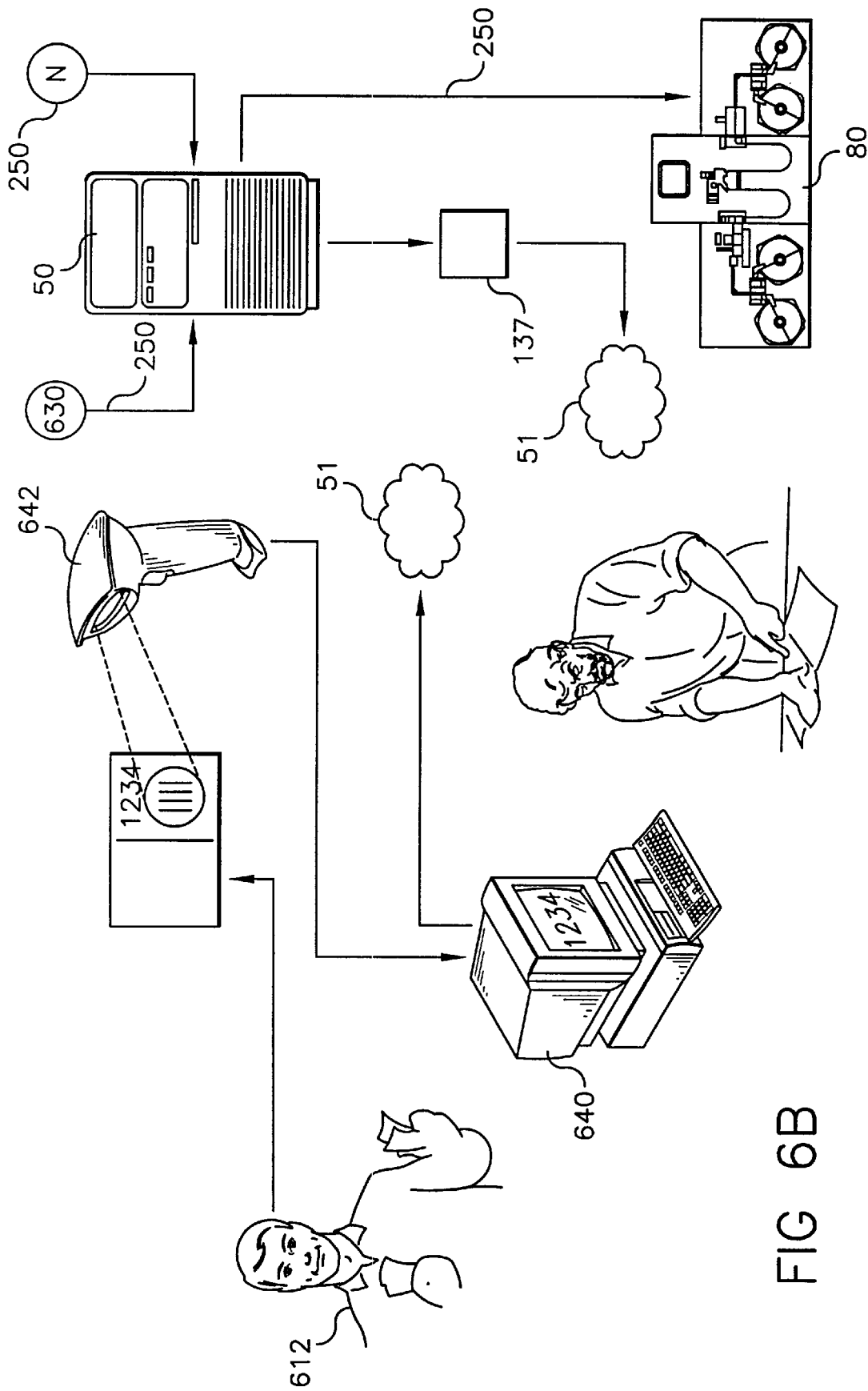

After a customer has received the printed images of his order and one or more certificates, there are a number of methods by which a printed customer certificate, such as that of FIG. 5, can be used. Several methods are illustrated in FIGS. 6A–6B. In one method, a customer 610 uses a telephone 620 to call a remote operator 626 (who may or may not be at the photofinishing laboratory) of FIGS. 1A–1B, and reads to operator 626 the alphanumeric codes 504, 506 which operator 626 enters into an operator interface (such as a keyboard, mouse, voice recognition, or the like) of a computer terminal 630. Terminal 630 communicates this information to IDM 50 through network 250. In a second method, a customer 612 attends at a kiosk or retail outlet and has bar codes 505, 511 machine read by a bar code reader (a "second" code reader) of a computer 640. Computer 640 includes an internal communication module which communicates this data to IDM 50 through remote network 51. In a third method, a consumer 614 places the customer certificate of FIG. 5 in an order envelope 650 (or, if the customer certificate is printed with the photofinishing laboratories' address on the reverse side, simply affixes a postage stamp to the reverse side of the certificate). Envelope 650 is mailed to the photofinishing laboratory where operator 626 machine reads bar codes 505, 511 with bar code reader 632 attached to computer 630 which then forwards this data to IDM 50 through network 250. In any of the methods, IDM 50 will then retrieve the image 501 based on code 511 or 512, and generate the digital image signal(s) (including any necessary image processing) for the product and/or service as indicated by code 504. Where the product includes a printed image (such as an enlargement of image 501), this can be printed on printer 80.

Variations of the above specific embodiments include using a certificate which is electronic rather than a printed hardcopy certificate. Such an electronic certificate could be delivered to a customer's home personal computer through network 51, for example.

The invention has been described in detail with particular reference to certain preferred embodiments thereof, but it will be understood that variations and modifications can be effected within the spirit and scope of the invention.

Parts List 1 envelope
2 spaces
3 bag
4a,b,c envelope boxes
5 code
7 number
9 scanner section
10 cassettes
11 bin
12 films
16 image
17 ticket
20 splicer
30 developer
31 reel
33 batches
40 scanner unit
41 scanner
42 reader
44 frame identification code
45 splice identification code
50 IDM
51 network
52 monitor
60 LMS
62 computer
64 keyboard/mouse
66 CRT display
80 digital printer
90 optical printer
100 developer
101 web
102 scanner
110 inspection station
120 finishing station
121 Prints
130 Printer
131 communication module
133,135 writers
212a,b,c films
213a,b,c codes
214a,b end
216 images
250 network
300,301 stations
302 computer
305 display
306 input device
310 screen
325 microphone
500,500a customer certificates
501 image
503 info portion
504,512 alphanumeric code
506,507 messages
505 ID bar code
508 logo
509 message
510 image
511 bar code
513 logos
610 customer
612 customer
614 consumer
620 telephone
626 operator
630 terminal
632 bar code reader
640 computer
650 envelope

What is claimed is:

1. A method of processing customer image orders each of at least one image capturing an original scene, comprising:
   (a) generating an image content identification in the form of an image content identification signal, based on an identification of one or more scene objects, for at least one image of a customer order;
   (b) comparing the generated image content identification, with different image content identifications stored in a memory in association with respective predetermined customer certificate data; and
   (c) when at least a generated image content identification matches a stored image content identification, generating a customer certificate from the stored certificate data associated with the matching stored image content identification.

2. A method according to claim 1 wherein the images are in the form of image signals, in step (a) simulated images corresponding to the image signals are provided on a display, and wherein the image content identification signal is generated in response to an operator input following viewing of the simulated images.

3. A method according to claim 1 additionally comprising printing the generated customer certificate.

4. A method according to claim 3 wherein each customer certificate contains a unique identification of one or more images of the customer order containing the image which prompted generation of that certificate.

5. A method according to claim 1, additionally comprising fulfilling each customer order by forming a customer requested image product incorporating an image of the order or performing a customer requested service incorporating an image of the order.

6. A method according to claim 5 wherein a customer order is fulfilled by printing images of the order.

7. A method according to claim 5 wherein the generated customer certificate is printed on a back side of a printed image of the order.

8. A method according to claim 5 additionally comprising collating each of a plurality of generated customer certificates with the fulfilled customer order containing the image which prompted generation of that certificate.

9. A method according to claim 8 wherein the customer certificate is printed on the same printer as, and in sequence with, the images of the customer order containing the image which prompted generation of the customer certificate.

10. A method according to claim 1 additionally comprising receiving an image category identification signal associated with at least one image in a customer order, and wherein generation of a customer certificate is further a function of the received image category identification.

11. A method according to claim 10 wherein the customer image orders each comprise at least one film, and wherein an image category identification is carried by a film as a machine readable code, the method additionally comprising machine reading the code to obtain the image category identification signal.

12. A method according to claim 10 wherein the customer image orders each comprise at least one film, and wherein the image category identification is a category identification carried on a medium associated with the customer image order.

13. A method according to claim 12 additionally comprising machine reading the medium to generate the category identification signal.

14. A method according to claim 12 wherein the memory has multiple predetermined certificate data associated with a first content identification, and wherein in step (c) when the generated image content identification matches the first content identification, the customer certificate is generated from data selected from the multiple certificate data based on the category identification associated with the customer order containing the image which prompted generation of the certificate.

15. A method according to claim 10 wherein a customer certificate for an image is not generated based on a category identification, even when at least a generated image content identification for that image matches a stored image content identification.

16. A method according to claim 2 wherein:
in step (b) simulated images corresponding to the image signals are provided on a display for viewing by an operator;
the image content identification signal is generated in response to an operator input;
and wherein a simulated image corresponding to an image is not provided for review on the display based on a category identification associated with that image.

17. A method according to claim 1 wherein the customer image orders each comprise at least one film, and wherein when no customer certificate is generated for a customer order based on an image content identification of an image of the order, a predetermined default customer certificate is generated.

18. A method of processing customer image orders each of at least one photographic film containing one or more images which capture an original scene, comprising:
(a) chemically developing the films;
(b) scanning the images on the developed films to yield corresponding image signals;
(c) generating an image content identification in the form of an image content identification signal, based on an identification of one or more scene objects, for at least one image of a customer order;
(d) comparing a generated image content identification, with different image content identifications stored in a memory in association with respective different predetermined customer certificate data;
(e) when at least a generated image content identification matches a stored image content identification, generating a customer certificate from the stored certificate data associated with the matching stored image content identification;
(f) printing the generated customer certificate;
(g) fulfilling each customer order by forming a customer requested image product incorporating an image of the order or performing a customer requested service incorporating an image of the order;
(h) collating each generated customer certificate with the fulfilled customer order containing the image which prompted generation of that certificate.

19. A method according to claim 18 wherein in step (c) simulated images corresponding to the image signals are provided on a display, and wherein the image content identification signal is generated in response to an operator input.

20. A method according to claim 19 wherein a list of at least some of the content identifications stored in the memory are displayed prior to generating a content identification signal in response to an operator input.

21. A method of processing customer image orders each of at least one photographic media carrying one or more images each capturing an original scene, comprising for each order:
(a) scanning the images to obtain image signals corresponding to the images;
(b) reviewing the images and generating an image content identification signal in association with at least one image signal based on an identification of one or more scene objects;
(c) comparing a generated image content identification, with different image content identifications stored in a memory in association with respective predetermined customer certificate data;
(d) when at least a generated content identification matches a stored content identification, generating a composite customer certificate from the stored certificate data associated with the matching stored image content identification and from the image which prompted generation of that certificate.

22. A method according to claim 21 additionally comprising printing the composite customer certificate.

23. A method according to claim 21 additionally comprising:
(f) fulfilling each customer order by forming a customer requested image product incorporating an image of the order or performing a customer requested service incorporating an image of the order; and
(g) collating each of a plurality of generated customer certificates with the fulfilled customer order containing the image which prompted generation of that certificate.

24. A method according to claim 21 wherein in step (b) simulated images corresponding to the image signals are provided on a display, and wherein the image content identification signal is generated in response to an operator input.

25. A method according to claim 21 additionally comprising:
assigning a unique identification to a set of images of a customer order, and storing the corresponding image signals in association with a unique identification in an image database; and
printing the unique identification on the composite customer certificate.

26. A method according to claim 25 wherein each customer image order comprises at least one film, and wherein the set of images is the images on a single film.

27. A method according to claim 25 wherein the certificate carries an indication of a product or service for the image printed on the certificate, the method additionally comprising:

retrieving an image signal of the image set in the database corresponding to the printed unique identification on the certificate and producing the product or performing the service indicated on the certificate using the retrieved image signal.

28. A method according to claim 27 wherein the retrieved image signal corresponds to the image on the certificate.

29. A method according to claim 27 wherein the product or service indication is carried on the certificate as a machine readable code, the method additionally comprising:

machine reading the code;

producing the product or performing the service using the retrieved image signal, in response to the product or service indication of the machine read code.

30. A method according to claim 29 wherein the machine readable code includes an identification of instructions for modifying an image, and wherein the retrieved image signal is modified in accordance with those instructions.

31. A method according to claim 21 additionally comprising showing the composite customer certificate on a display prior to printing.

32. A method according to claim 21 wherein when multiple images of a customer order have the same content identification, the multiple images are merged with the customer certificate to form the composite customer certificate, the method additionally comprising showing a simulated composite customer certificate on a display.

33. The method according to claim 32 additionally comprising, following showing a simulated composite customer certificate on the display, modifying the composite customer certificate in response to operator input.

34. An apparatus for processing customer image orders each of at least one image capturing an original scene, comprising:

(a) an image content identification generator which generates an image content identification signal, based on an identification of one or more scene objects, for at least one image of a first customer order;

(b) a memory storing different image content identifications in association with respective predetermined customer certificate data;

(c) a processor which compares generated image content identifications with image content identifications stored in the memory and, when at least a generated image content identification matches a stored image content identification, generates a customer certificate from the stored certificate data associated with the matching stored image content identification.

35. An apparatus according to claim 34 additionally comprising a display to display simulated images corresponding to the image signals; and wherein the identification generator comprises an operator interface communicating with the processor so that content identification signals are generated in response to an operator input.

36. An apparatus according to claim 34 wherein the content identification generator comprises a first code reader to read a machine readable code carried by a film of the customer order from which the content identification generator generates the image content identification signal.

37. An apparatus according to claim 34 additionally comprising a first printer to print the generated customer certificate.

38. An apparatus method according to claim 37 wherein the processor generates as part of the certificate, a unique customer identification which identifies the customer order which prompted generation of that certificate.

39. An apparatus of claim 37 additionally comprising a second printer, which may be the same or a different printer from the first printer, to print images of the orders.

40. An apparatus according to claim 39 wherein the second printer prints the generated customer certificate on a back side of an image of the order printed by the first printer.

41. An apparatus according to claim 37 additionally comprising a collator to collate each of a plurality of generated customer certificates with the fulfilled customer order containing the image which prompted generation of that certificate.

42. An apparatus according to claim 34 additionally comprising a communication module to receive the customer images as image signals from a remote terminal.

43. An apparatus according to claim 34 wherein generation of a customer certificate by the processor is further a function of a category identification received by the processor.

44. An apparatus according to claim 43, additionally comprising a first code reader communicating with the processor, to read a category identification carried by a medium associated with a customer order as a machine readable code.

45. An apparatus according to claim 44, additionally comprising a first code reader communicating with the processor, to read a category identification carried by a film of a customer order as a machine readable code.

46. An apparatus according to claim 44 wherein the memory stores multiple predetermined certificate data associated with at least a first content identification, and wherein when the generated image content identification matches the first content identification, the processor selects the data from which the customer certificate is generated from among the multiple certificate data based on the category identification associated with the customer order containing the first image.

47. An apparatus according to claim 44 additionally comprising a display to display simulated images corresponding to the image signals, and wherein:

the identification generator comprises an operator interface communicating with the processor so that content identification signals are generated in response to an operator input; and when at least a generated image content identification for an image matches a stored image content identification, and an image category identification for that image corresponds to a predetermined identification, the display does not show a simulated image corresponding to that image.

48. An apparatus according to claim 34 wherein the memory additionally stores predetermined default certificate data, and wherein when the processor does not generate a customer certificate for an order the processor generates a default certificate from the default certificate data.

49. An apparatus for processing customer image orders each of at least one photographic film containing one or more images capturing an original scene, comprising:

(a) a developer to chemically develop the films;

(b) a scanner to scan the images on the developed films to yield corresponding image signals;

(b) an image content identification generator which generates an image content identification signal, based on an identification of one or more scene objects, for at least one image of a first customer order;

(c) a memory storing different image content identifications in association with respective predetermined customer certificate data;

(d) a processor which compares generated image content identifications with image content identifications stored in the memory and, when at least a generated image content identification matches a stored image content identification, generates a customer certificate from the stored certificate data associated with the matching stored image content identification;

(e) a first printer to print generated customer certificates; and (f) a second printer which may be the same or different from the first printer, to print one or more images of the developed film.

50. An apparatus according to claim 49 wherein the second printer prints the images using the corresponding image signals.

51. An apparatus according to claim 49 additionally comprising a display to display simulated images corresponding to the image signals; and wherein the identification generator comprises an operator interface communicating with the processor so that content identification signals are generated in response to an operator input.

52. An apparatus according to claim 51 wherein the processor causes a list of at least some of the content identifications stored in the memory to be shown on the display prior to generating a content identification signal in response to an operator input.

53. An apparatus for processing customer image orders each of at least one photographic media carrying one or more images capturing an original scene, comprising:

(a) a scanner to scan the images to yield corresponding image signals;

(b) an image content identification generator which generates an image content identification signal, based on an identification of one or more scene objects, for at least one image of a first customer order;

(c) a memory storing different image content identifications in association with respective predetermined customer certificate data;

(d) a processor which compares generated image content identifications with image content identifications stored in the memory and, when at least a generated image content identification matches a stored image content identification, the processor generates a composite customer certificate from the stored certificate data associated with the matching stored image content identification, and from the image which prompted generation of that certificate.

54. An apparatus according to claim 53 additionally comprising a printer to print the composite customer certificate.

55. An apparatus according to claim 53 additionally comprising a display to display simulated images corresponding to the image signals; and wherein the identification generator comprises an operator interface communicating with the processor so that content identification signals are generated in response to an operator input.

56. An apparatus according to claim 54 wherein the processor:

assigns a unique identification to a set of images of a customer order, and causes the corresponding set of image signals to be stored in a memory in association with the unique identification; and causes the unique image identification to be recorded on the printed composite customer certificate.

57. An apparatus according to claim 56 additionally comprising a second code reader to read the unique image identification code recorded on the composite customer certificate, and wherein the processor in response to receiving the read unique identification from the second code reader, retrieves an image signal of the image set in the database corresponding to the unique identification.

58. An apparatus according to claim 57 wherein when the second code reader reads a predetermined product or service indication code carried on the certificate as a machine readable code, the processor causes the production of a product or performance of a service which corresponds to the read product or service code, using the retrieved image signal.

59. An apparatus according to claim 58 wherein the processor modifies the retrieved image signal in accordance with an indication for modifications contained in the read code.

60. A computer program product, comprising a computer readable storage medium having a computer program stored thereon which when loaded into the computer, causes the computer to perform the steps of:

(a) comparing a generated image content identification based on an identification of one or more objects in an original scene captured by a customer image, with different image content identifications stored in a memory in association with respective predetermined customer certificate data; and (b) when at least a generated image content identification matches a stored image content identification, generating a customer certificate from the stored certificate data associated with the matching stored image content identification.

61. A computer program product according to claim 60 wherein the computer program further causes simulated images corresponding to the customer images, to be shown on a display.

62. A computer program product according to claim 60 wherein the computer program further causes a generated customer certificate to be forwarded to an output device.

63. A computer program product according to claim 60 wherein the computer program further generates a customer certificate which includes a unique identification of a customer order containing the image which prompted generation of that certificate.

64. A computer program product, comprising a computer readable storage medium having a computer program stored thereon which when loaded into the computer, causes the computer to perform the steps of:

(a) receiving customer image signals corresponding to customer images each capturing an original scene, and receiving generated image content identifications in the form of image content identification signals, for respective images, based on one or more objects in respective original scenes captured by the images;

(b) comparing generated image content identifications with different image content identifications stored in a memory in association with respective predetermined customer certificate data;

(c) when at least a generated image content identification matches a stored image content identification, generating a customer certificate from the stored certificate data associated with the matching stored image content identification; and (d) forwarding the customer image signals and the generated customer certificate to one or more output devices.

* * * * *